(12) United States Patent
Loberg (10) Patent No.: US 9,189,571 B2
(45) Date of Patent: Nov. 17, 2015

(54) AUTOMATED RE-USE OF STRUCTURAL COMPONENTS

(75) Inventor: Barrie A. Loberg, Millarville, CA (US)

(73) Assignee: Ice Edge Business Solutions, LTD., Calgary, Alberta (CA)

( * ) Notice: Subject to any disclaimer, the term of this patent is extended or adjusted under 35 U.S.C. 154(b) by 0 days.

(21) Appl. No.: 13/579,261

(22) PCT Filed: May 18, 2012

(86) PCT No.: PCT/US2012/038582
§ 371 (c)(1),
(2), (4) Date: Aug. 15, 2012

(87) PCT Pub. No.: WO2012/173741
PCT Pub. Date: Dec. 20, 2012

(65) Prior Publication Data
US 2014/0214368 A1    Jul. 31, 2014

Related U.S. Application Data

(60) Provisional application No. 61/495,980, filed on Jun. 11, 2011.

(51) Int. Cl.
*G06F 17/50* (2006.01)
*G06Q 10/08* (2012.01)

(52) U.S. Cl.
CPC .......... *G06F 17/5004* (2013.01); *G06Q 10/087* (2013.01); *G06F 2217/02* (2013.01)

(58) Field of Classification Search
CPC  G06F 17/5004; G06F 3/0481; G06F 2217/02
USPC ............................... 703/1; 345/419, 420, 421
See application file for complete search history.

(56) References Cited

U.S. PATENT DOCUMENTS

| 4,510,369 A | 4/1985 | Harrison |
| 4,586,145 A | 4/1986 | Bracewell |

(Continued)

FOREIGN PATENT DOCUMENTS

| EP | 1098244 | 9/2001 |
| EP | 1204046 | 5/2002 |

(Continued)

OTHER PUBLICATIONS

Gajamani, Geeetha et al., "Automated Project Scheduling and Inventory Monitoring Using RFID", 2007, 24th International Symposium on Automation & Robiotics in Construction.*

(Continued)

*Primary Examiner* — Kamini S Shah
*Assistant Examiner* — Cedric D Johnson
(74) *Attorney, Agent, or Firm* — Workman Nydegger (57) ABSTRACT

Systems, methods, and apparatus allow for easy and efficient structural design and/or reconfiguration while using existing stock components. One or more implementations allow a designer to import a stock file containing an inventory of stock components that are usable as part of a structural design. In particular, one or more implementations allow the stock components to be used in a structural design while tracking, in real-time, the availability of stock components. Furthermore, one or more implementations automatically correlate stock components with existing components of a structural design or with new components as a designer inserts them into the structural design. Additionally, one or more implementations visually distinguish between new components in the structural design and stock components in the structural design. Furthermore, one or more implementations auto-select or modify surrounding components in the structural design to match an inserted stock component.

24 Claims, 5 Drawing Sheets

(56) References Cited

U.S. PATENT DOCUMENTS

| | | |
|---|---|---|
| 4,862,376 A | 8/1989 | Ferriter |
| 5,111,392 A | 5/1992 | Malin |
| 5,255,207 A | 10/1993 | Cornwell |
| 5,293,479 A | 3/1994 | Quintero |
| 5,339,247 A * | 8/1994 | Kirihara et al. ............... 700/106 |
| 5,414,801 A | 5/1995 | Smith |
| 5,514,232 A | 5/1996 | Burns |
| 5,555,357 A | 9/1996 | Fernandes |
| 5,572,639 A | 11/1996 | Gantt |
| 5,576,965 A | 11/1996 | Akasaka |
| 5,588,098 A | 12/1996 | Chen |
| 5,625,827 A | 4/1997 | Krause |
| 5,684,713 A | 11/1997 | Asada |
| 5,740,341 A | 4/1998 | Oota |
| 5,764,241 A | 6/1998 | Elliott |
| 5,764,518 A | 6/1998 | Collins |
| 5,870,771 A | 2/1999 | Oberg |
| 5,894,310 A | 4/1999 | Arsenault |
| 5,918,232 A | 6/1999 | Pouschine |
| 5,977,982 A | 11/1999 | Lauzon |
| 5,995,107 A | 11/1999 | Berteig |
| 6,014,503 A | 1/2000 | Nagata |
| 6,020,885 A | 2/2000 | Honda |
| 6,037,945 A | 3/2000 | Loveland |
| 6,052,669 A | 4/2000 | Smith |
| 6,253,167 B1 | 6/2001 | Matsuda |
| 6,292,810 B1 | 9/2001 | Richards |
| 6,295,513 B1 | 9/2001 | Thackston |
| 6,335,732 B1 | 1/2002 | Shaikh |
| 6,401,237 B1 | 6/2002 | Ishikawa |
| 6,459,435 B1 | 10/2002 | Eichel |
| 6,466,239 B2 | 10/2002 | Ishikawa |
| 6,483,508 B1 | 11/2002 | Ishikawa |
| 6,493,679 B1 | 12/2002 | Rappaport |
| 6,509,906 B1 | 1/2003 | Awe |
| 6,570,563 B1 | 5/2003 | Honda |
| 6,662,144 B1 | 12/2003 | Normann |
| 6,684,255 B1 | 1/2004 | Martin |
| 6,690,981 B1 | 2/2004 | Kawachi |
| 6,701,288 B1 | 3/2004 | Normann |
| 6,721,684 B1 | 4/2004 | Saebi |
| 6,772,168 B2 | 8/2004 | Ardoin |
| 6,888,542 B1 | 5/2005 | Clauss |
| 6,922,701 B1 | 7/2005 | Ananian |
| 6,944,513 B1 | 9/2005 | Tomomitsu |
| 6,971,063 B1 | 11/2005 | Rappaport |
| 6,985,832 B2 | 1/2006 | Saebi |
| 6,999,102 B2 | 2/2006 | Felser |
| 7,019,753 B2 | 3/2006 | Rappaport |
| 7,042,440 B2 | 5/2006 | Pryor |
| 7,062,454 B1 | 6/2006 | Giannini |
| 7,062,532 B1 | 6/2006 | Sweat |
| 7,062,722 B1 | 6/2006 | Carlin et al. |
| 7,065,420 B1 | 6/2006 | Philpott |
| 7,079,990 B2 * | 7/2006 | Haller et al. ...................... 703/2 |
| 7,080,096 B1 | 7/2006 | Imamura |
| 7,085,697 B1 | 8/2006 | Rappaport |
| 7,096,173 B1 | 8/2006 | Rappaport |
| 7,139,686 B1 | 11/2006 | Critz |
| 7,155,228 B2 | 12/2006 | Rappaport |
| 7,171,208 B2 | 1/2007 | Rappaport |
| 7,171,344 B2 | 1/2007 | Lind |
| 7,200,639 B1 | 4/2007 | Yoshida |
| 7,216,092 B1 | 5/2007 | Weber |
| 7,218,979 B2 | 5/2007 | Tsuji |
| 7,243,054 B2 | 7/2007 | Rappaport |
| 7,246,044 B2 | 7/2007 | Imamura |
| 7,246,045 B1 | 7/2007 | Rappaport |
| 7,249,005 B2 | 7/2007 | Loberg |
| 7,266,768 B2 | 9/2007 | Ferlitsch |
| 7,277,572 B2 | 10/2007 | MacInnes |
| 7,277,830 B2 | 10/2007 | Loberg |
| 7,299,168 B2 | 11/2007 | Rappaport |
| 7,299,416 B2 | 11/2007 | Jaeger |
| 7,318,063 B2 | 1/2008 | Brychell |
| 7,337,093 B2 | 2/2008 | Ramani |
| 7,340,383 B2 | 3/2008 | Mayuzumi |
| 7,353,192 B1 | 4/2008 | Ellis |
| 7,392,522 B2 | 6/2008 | Murray |
| 7,430,711 B2 | 9/2008 | Rivers-Moore |
| 7,437,376 B2 | 10/2008 | Sikchi |
| 7,444,195 B2 | 10/2008 | Smith |
| 7,479,959 B2 | 1/2009 | Han |
| 7,492,934 B2 | 2/2009 | Mundy |
| 7,516,399 B2 | 4/2009 | Hsu |
| 7,587,302 B2 | 9/2009 | Arvin |
| 7,620,638 B2 | 11/2009 | Nonclercq |
| 7,629,985 B2 | 12/2009 | McArdle |
| 7,643,027 B2 | 1/2010 | Rothstein |
| 7,643,966 B2 | 1/2010 | Adachi |
| 7,661,959 B2 | 2/2010 | Green |
| 7,676,348 B2 | 3/2010 | Okada |
| 7,761,266 B2 | 7/2010 | Mangon |
| 7,788,068 B2 | 8/2010 | Mangon |
| 7,814,436 B2 | 10/2010 | Schrag |
| 7,822,584 B1 | 10/2010 | Saebi |
| 7,823,074 B2 | 10/2010 | Takemura |
| 7,856,342 B1 | 12/2010 | Kfouri |
| 7,877,237 B1 | 1/2011 | Saebi |
| 7,996,756 B2 | 8/2011 | Eilers |
| 8,065,654 B2 | 11/2011 | Shiihara |
| 8,108,267 B2 | 1/2012 | Varon |
| 8,117,558 B2 | 2/2012 | Hoguet |
| 8,132,123 B2 | 3/2012 | Schrag |
| 8,134,553 B2 | 3/2012 | Saini |
| 8,185,219 B2 | 5/2012 | Gilbert |
| 8,195,434 B2 | 6/2012 | Powell |
| 8,244,025 B2 | 8/2012 | Davis |
| 8,255,338 B1 | 8/2012 | Brittan |
| 8,271,336 B2 | 9/2012 | Mikurak |
| 8,276,088 B2 | 9/2012 | Ke |
| 8,285,707 B2 | 10/2012 | Day |
| 8,290,849 B2 | 10/2012 | Eisler |
| 8,301,527 B2 | 10/2012 | Tarbox |
| 8,314,799 B2 | 11/2012 | Pelletier |
| 8,326,926 B2 | 12/2012 | Sangem |
| 8,332,401 B2 | 12/2012 | Hull |
| 8,332,827 B2 | 12/2012 | Edde |
| 8,334,867 B1 | 12/2012 | Davidson |
| 8,335,789 B2 | 12/2012 | Hull |
| 8,352,218 B2 | 1/2013 | Balla |
| 8,386,918 B2 | 2/2013 | Do |
| RE44,054 E | 3/2013 | Kim |
| 8,402,473 B1 | 3/2013 | Becker |
| 8,423,391 B2 | 4/2013 | Hessedenz |
| 8,442,850 B2 | 5/2013 | Schorr |
| 8,462,147 B2 | 6/2013 | Sugden |
| 8,468,175 B2 | 6/2013 | Obata |
| 8,499,250 B2 | 7/2013 | Wetzer |
| 8,508,539 B2 | 8/2013 | Vlietinck |
| 8,510,382 B2 | 8/2013 | Purdy |
| 8,510,672 B2 | 8/2013 | Loberg |
| 8,533,596 B2 | 9/2013 | Boss |
| 8,572,558 B1 | 10/2013 | Mathieu |
| 8,583,375 B2 | 11/2013 | Baule |
| 8,600,989 B2 | 12/2013 | Hull |
| 8,626,877 B2 | 1/2014 | Greene |
| 8,645,973 B2 | 2/2014 | Bosworth |
| 8,650,179 B2 | 2/2014 | Driesch |
| 8,763,009 B2 | 6/2014 | Degirmenci |
| 8,773,426 B1 | 7/2014 | Hamel |
| 8,819,072 B1 | 8/2014 | Croicu |
| 8,914,259 B2 | 12/2014 | Kripac |
| 8,933,925 B2 | 1/2015 | Sinha |
| 8,949,789 B2 | 2/2015 | Schlarb |
| 8,954,295 B1 | 2/2015 | Vicknair |
| 8,994,726 B1 | 3/2015 | Furukawa |
| 9,075,931 B2 | 7/2015 | Charles |
| 9,106,425 B2 | 8/2015 | Murphey |
| 9,117,308 B1 | 8/2015 | Nag |
| 2001/0024211 A1 | 9/2001 | Kudukoli |
| 2001/0024230 A1 | 9/2001 | Tsukahara |
| 2001/0047250 A1 | 11/2001 | Schuller |
| 2001/0047251 A1 | 11/2001 | Kemp |

(56) References Cited

U.S. PATENT DOCUMENTS

| | | |
|---|---|---|
| 2002/0010589 A1 | 1/2002 | Nashida |
| 2002/0069221 A1 | 6/2002 | Rao |
| 2002/0083076 A1 | 6/2002 | Wucherer |
| 2002/0085041 A1 | 7/2002 | Ishikawa |
| 2002/0091739 A1 | 7/2002 | Ferlitsch |
| 2002/0093538 A1 | 7/2002 | Carlin |
| 2002/0095348 A1 | 7/2002 | Hiroshige |
| 2002/0144204 A1 | 10/2002 | Milner |
| 2002/0158865 A1 | 10/2002 | Dye |
| 2002/0188678 A1 | 12/2002 | Edecker |
| 2002/0196285 A1 | 12/2002 | Sojoodi |
| 2003/0097273 A1 | 5/2003 | Carpenter |
| 2004/0012542 A1 | 1/2004 | Bowsher |
| 2004/0027371 A1 | 2/2004 | Jaeger |
| 2004/0098691 A1 | 5/2004 | Teig |
| 2004/0117746 A1 | 6/2004 | Narain |
| 2004/0145614 A1 | 7/2004 | Takagaki |
| 2004/0153824 A1 | 8/2004 | Devarajan |
| 2004/0204903 A1 | 10/2004 | Saebi |
| 2004/0205519 A1 | 10/2004 | Chapel |
| 2004/0236561 A1* | 11/2004 | Smith et al. ............... 703/22 |
| 2005/0041028 A1 | 2/2005 | Coutts |
| 2005/0065951 A1 | 3/2005 | Liston |
| 2005/0071135 A1 | 3/2005 | Vredenburgh |
| 2005/0081161 A1 | 4/2005 | MacInnes |
| 2005/0203718 A1* | 9/2005 | Carek et al. ............... 703/1 |
| 2005/0256874 A1 | 11/2005 | Chiba |
| 2006/0028695 A1 | 2/2006 | Knighton |
| 2006/0041518 A1 | 2/2006 | Blair |
| 2006/0041842 A1 | 2/2006 | Loberg |
| 2006/0055696 A1* | 3/2006 | Loberg ............... 345/427 |
| 2006/0119601 A1 | 6/2006 | Finlayson |
| 2006/0143220 A1 | 6/2006 | Spencer |
| 2006/0174209 A1 | 8/2006 | Barros |
| 2006/0206623 A1 | 9/2006 | Gipps |
| 2006/0271378 A1 | 11/2006 | Day |
| 2007/0088704 A1 | 4/2007 | Bourne |
| 2007/0097121 A1 | 5/2007 | Loop |
| 2007/0115275 A1 | 5/2007 | Cook |
| 2007/0168325 A1 | 7/2007 | Bourne |
| 2007/0180425 A1 | 8/2007 | Storms |
| 2007/0188488 A1 | 8/2007 | Choi |
| 2007/0204241 A1 | 8/2007 | Glennie |
| 2007/0219645 A1 | 9/2007 | Thomas |
| 2007/0226075 A1* | 9/2007 | Hiroshige et al. ............... 705/26 |
| 2007/0240049 A1 | 10/2007 | Rogerson |
| 2007/0250295 A1 | 10/2007 | Murray |
| 2007/0260432 A1 | 11/2007 | Okada |
| 2007/0271870 A1 | 11/2007 | Mifsud |
| 2007/0294622 A1 | 12/2007 | Sterner |
| 2008/0036769 A1 | 2/2008 | Coutts |
| 2008/0077364 A1 | 3/2008 | Wakelam |
| 2008/0126021 A1 | 5/2008 | Hoguet |
| 2008/0140732 A1 | 6/2008 | Wilson |
| 2008/0141334 A1 | 6/2008 | Wicker |
| 2008/0174598 A1 | 7/2008 | Risenhoover |
| 2008/0188969 A1* | 8/2008 | O'Malley et al. ............... 700/97 |
| 2008/0238946 A1 | 10/2008 | Baughman |
| 2008/0249756 A1 | 10/2008 | Chaisuparasmikul |
| 2008/0275674 A1 | 11/2008 | Reghetti |
| 2008/0282166 A1 | 11/2008 | Fillman |
| 2008/0303844 A1 | 12/2008 | Reghetti |
| 2008/0309678 A1 | 12/2008 | Reghetti |
| 2009/0069704 A1 | 3/2009 | MacAdam |
| 2009/0110307 A1 | 4/2009 | Markowitz |
| 2009/0113349 A1 | 4/2009 | Zohar |
| 2009/0119039 A1 | 5/2009 | Banister |
| 2009/0138826 A1 | 5/2009 | Barros |
| 2009/0148050 A1 | 6/2009 | Reghetti |
| 2009/0187385 A1 | 7/2009 | Zegdoun |
| 2009/0210487 A1 | 8/2009 | Westerhoff |
| 2009/0248184 A1 | 10/2009 | Steingart |
| 2009/0254843 A1 | 10/2009 | Van Wie |
| 2009/0273598 A1 | 11/2009 | Reghetti |
| 2010/0017733 A1 | 1/2010 | Barros |
| 2010/0042516 A1* | 2/2010 | Knipfer et al. ............... 705/29 |
| 2010/0121614 A1 | 5/2010 | Reghetti |
| 2010/0122196 A1 | 5/2010 | Wetzer |
| 2010/0138762 A1 | 6/2010 | Reghetti |
| 2010/0185514 A1 | 7/2010 | Glazer |
| 2010/0302245 A1 | 12/2010 | Best |
| 2011/0078169 A1 | 3/2011 | Sit |
| 2011/0169826 A1 | 7/2011 | Elsberg |
| 2011/0258573 A1 | 10/2011 | Wetzer |
| 2011/0320966 A1 | 12/2011 | Edecker |
| 2012/0005353 A1 | 1/2012 | Edecker |
| 2012/0069011 A1 | 3/2012 | Hurt |
| 2012/0331422 A1 | 12/2012 | High |

FOREIGN PATENT DOCUMENTS

| | | | |
|---|---|---|---|
| FR | 2563516 | | 10/1985 |
| GB | 120633 | | 11/1918 |
| GB | 2364801 A | * | 2/2002 |
| JP | 62127426 | | 6/1987 |
| JP | 10334127 | | 12/1998 |
| JP | 2005301630 | | 10/2005 |
| WO | 9003618 | | 4/1990 |
| WO | 9322741 | | 11/1993 |
| WO | 0219177 | | 3/2002 |
| WO | 02075597 | | 9/2002 |
| WO | 03023559 | | 3/2003 |
| WO | 2005033985 | | 4/2005 |
| WO | 2006018744 | | 2/2006 |
| WO | 2007093060 | | 8/2007 |
| WO | 2007106873 | | 9/2007 |
| WO | 2006018740 | | 2/2009 |
| WO | 2009100538 | | 8/2009 |

OTHER PUBLICATIONS

International Search Report and Written Opinion for PCT/US2012/038582 mailed Dec. 28, 2012.
Chan, et al.: "Design of a Walkthrough System for Indoor Environments from Floor Plans"; Proceedings of the 1998 IEEE Conference on Information Visualization, Jul. 29-31, 1998, pp. 50-57.
Edward J. DeJesus, James P. Callan, and Curtis R. Whitehead, Pearl: An Expert System for Power Supply Layout, 23rd Design Automation Conference, Paper 34.4, IEEE, 1986, /C.J./.
Josie Wernecke; Title: The Inventor Mentor: Programming Object Oriented 3D Graphics with Open Inventor; Release 2; Date: Jun. 19, 1997; Published on Web Site: www.cs.ualberta.cal-.
International Search Report and Opinion on PCT/CA2007/000241, mailed May 15, 2007.
International Search Report and Opinion on PCT/CA2009/000190, mailed Jun. 5, 2009.
International Search Report and Opinion on PCT/CA2009/000183, mailed Jun. 9, 2009.
International Search Report and Opinion on PCT/CA2009/000311, mailed Jul. 30, 2009.
International Search Report & Written Opinion for PCT/US2010/058092 dated Jul. 27, 2011.
Marir F et al: "OSCONCAD: a model-based CAD system integrated with computer applications", Proceedings of the International Construction IT Conference, vol. 3, 1998.
EPO Search Report for EP07701791 dated Aug. 21, 2012.
International Search Report for PCT/CA2009000190 mailed Apr. 12, 2012.
Blythe, Rise of the Graphics Processor, IEEE, 2008.
U.S. Office of Personnel Management, Clear Cache, IE, 2007.
Wang, Intellectual Property Protection in Collaborative Design through Lean information Modeling and Sharing , 2006.
Lea, Community Place Architecture and Performance, 2007.
Autodesk, Maya 8.5 Shading, 2007.
CRC, Final Report Collaboration Platform. 2009.
Mental Images GmbH, RealityServer Functional Overview White Paper, 2007.
Rozanski, Software Systems Architecture Working With Stakeholders Using Viewpoints and Perspectives, 2008.
Sony, Community Place Conductor 2.0 Users Manual, 1998.

(56) References Cited

OTHER PUBLICATIONS

Vasko, Collaborative Modeling of Web Applications for Various Stakeholders, 2009.

Gross M D: "Why can't CAD be more like Lego? CKB, a program for building constructions kits", Automation in Construction, Elsevier Science Publishers, Amsterdam, NL, vol. 5, No. 4, Oct. 1, 1996 pp. 285-300, XP004072247, ISSN: 0926-5805, DOI:10.1016/S0926-5805(96)00154-9.

European Search Report—Application No. 10 833 972.2 mailed Feb. 2, 2015.

European Search Report—Application No. 12800327.4 mailed Feb. 18, 2015.

Funkhouser T et al: Modeling by example, ACM Transactions on Grpahic (TOG), ACM, US, vol. 23, No. 3, Aug. 1, 2004, pp. 652-663, XP008087089, ISSN: 0730-0301, DOI: 10.1145/1015706.1015775 *abstract* *p. 652, col. 1, paragraph 2- col. 2, paragraph 2* *p. 656, col. 1, paragraph 3-5*.

Anonymous: "Dresden Frauenkirche- Wikipedia, the free encyclopedia", Jun. 8, 2011, pp. 1-7, XP055168540 retrieved from the Internet: URL: https://en.wikipedia.org/w/index.php?title=Dresden_Frauenkirche&oldid=433207596 [retrieved on Feb. 9, 2015] *p. 3, paragraph 7-9*.

Wollongong, City Centre 3D Model Specifications, May 18, 2009.

Notice of Allowance for U.S. Appl. No. 13/510,912 mailed Sep. 14, 2015.

* cited by examiner

Fig. 1

| Description | Tag | Status | In Stock | In Drawing | Available | New Req. | Damaged |
|---|---|---|---|---|---|---|---|
| Modular Glass Wall Assembly | F292 | New | 0 | 10 | 0 | 10 | 0 |
| Modular Glass Wall Assembly | F293 | Stock | 4 | 1 | 2 | 0 | 1 |
| Sliding Door - Glass | F230 | Stock | 10 | 8 | 1 | 0 | 1 |
| Sliding Door - Wood | F232 | Stock | 2 | 0 | 2 | 0 | 0 |
| Sliding Door - Frame | BD6 | Stock/New | 4 | 8 | 0 | 4 | 0 |
| Base Trim | R110 | New | 0 | 6 | 0 | 6 | 0 |
| Floor Track | T216 | New | 0 | 5 | 0 | 5 | 0 |

AUTOMATED RE-USE OF STRUCTURAL COMPONENTS

CROSS-REFERENCE TO RELATED APPLICATIONS

This application is 35 U.S.C. §371 U.S. National Stage of PCT/US12/38582 filed on May 18, 2012, entitled "Automated Re-Use of Structural Components," which claims the benefit of priority to U.S. Provisional Patent Application No. 61/495,980, filed on Jun. 11, 2011, entitled "Automated Reconfiguration of an As-Built Design in Intelligent Design Software." The entire content of the aforementioned patent applications is incorporated herein by reference.

BACKGROUND OF THE INVENTION

1. Field of the Invention

The present invention relates generally to computer-aided design or drafting software that assists in reuse of existing stock components in a structural design.

2. Background and Relevant Art

Many industries use computer-aided design (CAD) software (e.g., AutoCAD, Revit, 3DS Max, SketchUp, etc.) to design and create three-dimensional computer models. Increasingly, designers use CAD software to model architectural structures. Often, designers incorporate existing structural components (e.g., modular wall panels, cubicle components, doors, HVAC components, integrated desk components, electrical components, etc.) into structural models. For example, designers may use CAD software to design a new architectural structure that makes use of existing components, or may reconfigure an existing architectural structure. Designers may also use CAD software to incorporate existing non-structural components (e.g., furniture) into structural models.

When modeling an architectural structure using existing components, designers must identify the availability of the existing stock components to develop an inventory of available stock. For example, designers may physically walk through an existing structure, noting various components that make up the structure. In such situations, taking an inventory of existing components is easiest when the existing structure is already unassembled. In these situations, designers cannot incorporate existing components into new designs until after disassembly of the existing structure. Designers may also consult old purchase orders, or manually enumerate a list of components used in old designs.

In addition, designers who use conventional CAD software to incorporate existing components into a structural design often need to manually track use of existing components. Designers may track which existing components they have incorporated into the structural design, and which existing components remain available for use. For example, as designers add existing components to structural designs, the designers may manually note which components they have reserved for the designs (e.g., on paper, using a spreadsheet, etc.). As designs change and evolve, designers typically have to constantly update their notes. Doing so can be time consuming, tedious, and prone to error.

In addition to the foregoing, tracking reuse of available stock parts using conventional CAD software typically requires a designer to complete a new design. Upon finishing the design, the CAD software creates a part list for the new design and compares it to a part list of available stock parts. The CAD software then provides the number of stock parts used in the new design. If un-satisfied with the amount of inventory parts being used in the new design, conventional CAD software requires the designer to blindly create a new design in an attempt to see if they can incorporate more stock or inventory parts.

Furthermore, conventional CAD software provides limited information about where or how the stock parts are used in the new design. As mentioned previously, typically conventional software will only compare part lists. Thus, an installer trying to build the new design using both stock parts and new parts often has to exert greater effort and time in an attempt to determine where and how the stock parts fit in the new design.

Accordingly, there are a number of problems in the art relating to reusing existing stock components in structural designs.

BRIEF SUMMARY OF THE INVENTION

Implementations of the present invention overcome one or more problems in the art with systems, methods, and apparatus configured to allow easy and efficient structural design and/or reconfiguration while reusing existing stock components. In particular, one or more implementations allow a designer to import a stock file containing an inventory of stock components that are usable as part of a new structural design. One or more implementations allow for the use of the stock components in a new structural design while tracking, in real-time, the availability of stock components. One or more implementations automatically correlate stock components with existing components of a structural design, or with new components as designers insert them into the structural design. Additionally, one or more implementations visually distinguish between new components in the structural design and stock components in the structural design.

For example a computer-implemented method for visually modeling a new structural design, in real-time, at a structural design software application can include a computer system importing a stock file. The stock file can include a plurality of existing components of an existing structural design that are available for use in the new structural design. The method can also include the computer system identifying each of the existing components that are in the stock file. In addition, the computer system can receive user input specifying a new design element of the new structural design. The computer system can automatically identify that one or more of the existing components correspond with one or more components of the new design element. The computer system can associate the automatically identified existing components with the new structural design, and visually distinguish between any existing components and any new components that are associated with the new structural design.

In addition, a method for modifying a structural design in real-time at a structural design software application can include a computer system receiving both a new structural design and a stock file. The stock file includes a plurality of existing components that are part of an existing structural design, and which are available for use in the new structural design. The computer system identifies each of the existing components that are in the stock file, and identifies existing components that are usable in the new structural design. The computer system associates the identified existing components that are usable in the new structural design with the new structural design.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention overcome one or more problems in the art with systems, methods, and apparatus configured to allow easy and efficient structural design and/or reconfiguration while reusing existing stock components. In particular, one or more implementations allow a designer to import a stock file containing an inventory of stock components that are usable as part of a new structural design. One or more implementations allow for the use of the stock components in a new structural design while tracking, in real-time, the availability of stock components. One or more implementations automatically correlate stock components with existing components of a structural design, or with new components as designers insert them into the structural design. Additionally, one or more implementations visually distinguish between new components in the structural design and stock components in the structural design.

In particular, one or more implementations of the present invention enable programmatic evaluation of pre-existing stock components, and automatically applies the evaluation to a new design configuration. In addition, one or more implementations enable continual optimization of the use of pre-existing stock components as the new design changes, and thus constantly re-solving a reconfiguration. One or more implementations of the present invention also provide the ability to programmatically evaluate stock components at a part or assembly level, and to provide alternative assemblies for use in the new configuration.

Such implementations can also accept user input to identify components which are damaged or otherwise not suitable for re-use in the new design, and exclude such components from the new design as applicable. In addition, one or more implementations of the present invention provide the ability to accept user input to identify components which are to be used in specific locations in the new configuration, and lock such parts or assemblies in place. Furthermore, implementations of the present invention provide the ability to generate detailed reports of pre-existing parts or assemblies to show what has been used in the new configuration, what is still left in pre-existing inventory, and what needs to be ordered to create the new configuration.

For example, at least one implementation relates to developing an inventory of available stock components (e.g., modular components, parts, assemblies, furniture). The systems, software, and methods of the present invention can import and utilize a "stock file," which describes stock components that are already owned by an entity and that are available for use in a structural design or reconfiguration. In one or more implementations, a design software application generates the stock file based on a previous structural design. Alternatively, the stock file may comprise a previous structural design file itself. In still further implementations, an inventory software application, a spreadsheet software application, a database software application, or any other appropriate software application generates the stock file.

Using the inventory of available stock components, one or more implementations automatically incorporate the stock components into a new structural design, or a reconfiguration of an existing structural design. When doing so, the systems, software, and methods can automatically update the stock inventory in real-time, and indicate to the designer which stock components have been used and/or which stock components remain. Furthermore, one or more implementations may apply stock components to a structural design as the designer creates the design (i.e., as the designer inserts design elements into the structural design). Additionally or alternatively, implementations of the present invention may apply stock components to an existing structural design (i.e., by replacing components of a structural design with stock components).

In one or more implementations, systems, software, and methods of the present invention visually distinguish between stock components in a structural design and new components in the structural design. For example, a design software application may apply one color to stock components and a different color to new components. In another example, a design software application may apply different colors to component identifiers. In yet other examples, design software applications may apply different textures and/or shading to components to distinguish between stock components and new components.

In one or more implementations, systems, software, and methods of the present invention distinguish between stock components in a structural design and new components in the structural design using text. For example, a design software application may annotate stock components and new components as such using text labels (e.g., "new" or "stock"). A design software application may also append or prepend text labels to component identifiers to identify whether a component is new or stock.

Thus, one or more implementations allow the designer or user to note where each stock part or assembly came from and how many more remain in inventory. Furthermore, all information is updated graphically and instantaneously. Thus, one or more implementations can help reduce design time, and increase the reuse of parts and assemblies. The real-time visual/graphical feedback and lead to a reduction of unnecessarily ordering new product. One will appreciate in light of the disclosure herein that one or more implementations can reduce the expensive and damaging mindset of disposing viable materials and products.

In addition, one or more implementations of systems, software, and methods of the present invention adjust a structural design to accommodate stock components and/or to maximize re-use of stock components. For example, in response to a designer inserting a component, a design software application may automatically adjust surrounding components to accommodate the inserted component. Accommodating an inserted component may include changing surrounding components to different types, size, or style of new components or to different stock components.

One will thus appreciate that because the systems, methods, and computer program products of the present invention include design components that include associated product attributes and parameters, a non-expert can easily and efficiently create accurate, designs incorporating existing or stock parts and/or assemblies. Furthermore, implementations of the present invention can apply rules and behaviors and interpret design intent automatically, not only providing an accurate layout, but also allowing change at any time without rework. Implementations of the present invention can also recognize required changes effected by user driven changes (i.e., choosing to replace a given design component with a stock component), and automatically resolve the design layout, including required component substitutions and dimensional changes, to help maintain validity.

Along similar lines, one or more implementations of the present invention provide software that can recognize required changes affected by the user-driven change, and re-solve the layout design to automatically include required component additions, component substitutions, and/or dimensional changes effected by the user driven design change. The design software system can change product types (e.g., from new components to stock components, with its own set of independent behaviors and product rules), and resolve to the design and its relative behaviors and rules. An auto-solve function in the design software system can identify areas of conflict in the design and either solve the conflicts automatically, or provide choices for the correction. The design software system can also implement the selected solution automatically (e.g., once the end-user has made a choice).

Generally, a user can create layouts in a two-dimensional plan view, although users need not work in a linear sequential manner. In most cases, the user is free to design in any manner they wish, and the design software system will understand the design intent and resolve the design accordingly. Additionally, implementations of the present invention can represent the design space in three-dimensional graphics. Thus, a user can easily and quickly toggle between different views or representations to gain a complete understanding of the design space and design components therein. The design software system can create each of these separate views using the same dataset. Thus, one will appreciate that implementations of the present invention can eliminate the need to audit between information sources. Furthermore, because each representation can be based on the same dataset, the design software system can instantly and simultaneously resolve and modify all representations.

Furthermore, through the use of an object-oriented programming language (e.g., Java), the design software system can create programming objects for each component, attribute, option, relationship, and behavior. The design software system can store these objects within a single data structure. Additionally, the design software system can cause each object, in turn, to resolve itself in the design. The design software system can thus appropriately propagate user input at any level of this dataset to all objects in the data structure, thereby resolving the complete design through the resolving of each object individually. In addition, implementations of the present invention can include a solution level programming object, which recognizes behaviors and relationships between objects within the design. As also discussed above, the solution-level programming object can also resolve itself with each user input.

Figure 1:
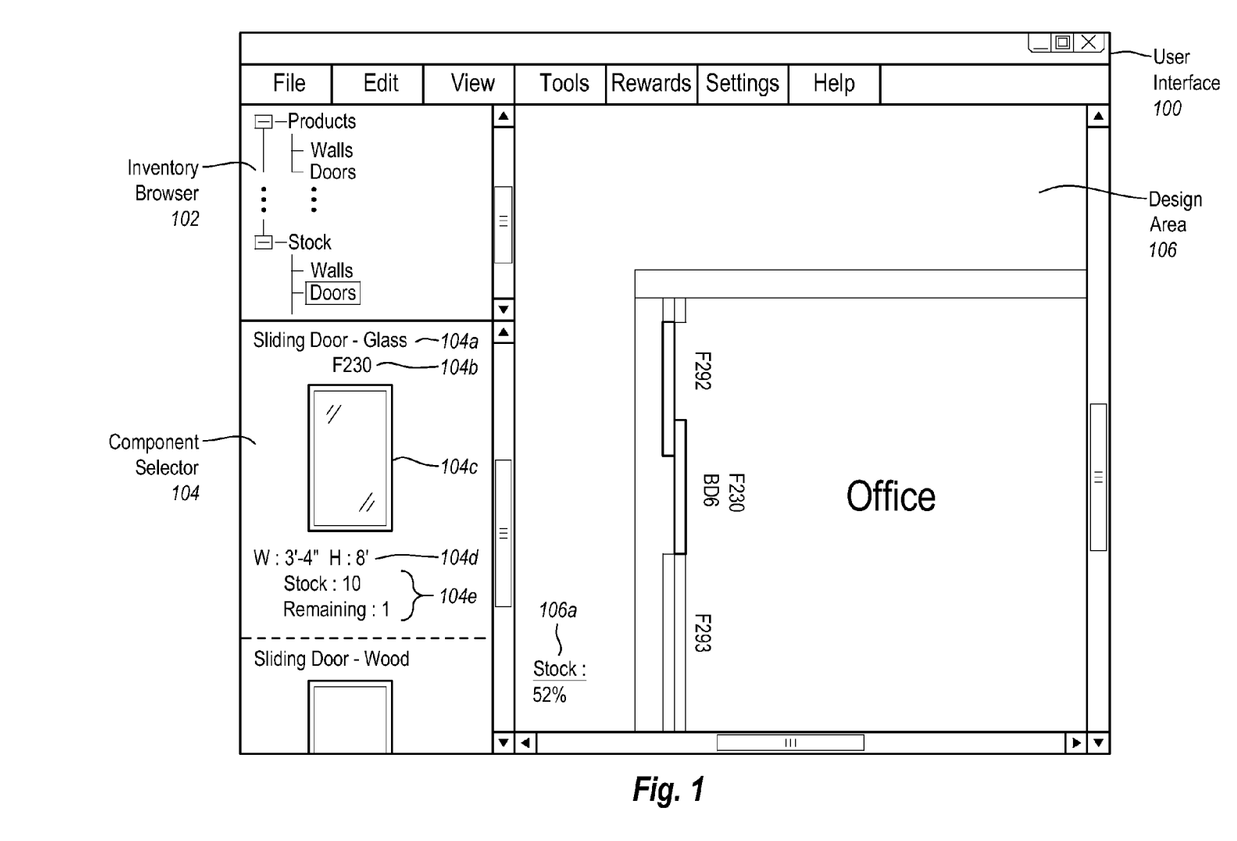
FIG. 1 illustrates a schematic diagram of a user interface of an exemplary design software application with which an implementation of the present invention can integrate to use stock components in a structural design.

In at least one implementation, the systems, methods, and computer products of the present invention allow a user to select various design components from a product menu, which the user can then add to a design space. One will appreciate that a user can also select the design components from a product menu, or the user can import them into the design software system from another software program. For example, FIG. 1 depicts a schematic diagram of a user interface 100 of an exemplary design software application with which implementations of the present invention can integrate to reuse stock components in structural design. The user interface 100 enables designers to incorporate components from a stock inventory into a structural design. The user interface 100 can enable designers to use stock components exclusively in structural designs, or can enable designers to combine stock components with new components (i.e., components to purchase) in structural designs. As depicted, the user interface 100 includes an inventory browser 102, a component selector 104, and a design area 106.

The inventory browser 102 presents a selection of components that are available for use in structural designs. As depicted, for example, the inventory browser 102 may present a hierarchical listing of component categories and sub-categories, though any appropriate selection mechanism falls within the scope of the present invention. The inventory browser 102 can enable designers to select both new components and stock components for use in structural designs. As depicted, for example, the inventory browser 102 includes a "products" category that contains sub-categories (e.g., walls, doors) of new components, and a "stock" category that contains sub-categories (e.g., walls, doors) of stock components. As used herein the term "stock" refers to a part, assembly, or subassembly which has previously been purchased and is either currently in use in a space or structure that is being redesigned, or is otherwise available in inventory for use. A "new" product on the other hand refers to a part, assembly, or subassembly that is not in inventory and needs to be purchased.

The component selector 104 presents components that are available within a particular selection of the inventory browser 102. For example, when a designer selects a category or sub-category in the inventory browser 102, the component selector 104 may present components within the selected category or sub-category. As such, depending on the category selected in the inventory browser 102, the component selector 104 may present either new components or stock components. For example, if a designer selects the depicted "doors" sub-category of the "products" category, then the component selector 104 may display new door components that are available for purchase and integration into a structural design. Similarly, if the designer selects the depicted "doors" sub-category of the "stock" category, then the component selector 104 may display components from the stock inventory, which are available for integration into the structural design.

In the depicted example, a designer has selected the "doors" sub-category of the "stock" category. Thus, the component selector 104 displays stock door components that are available for use in a structural design. The component selector 104 may present components in any appropriate manner. As depicted, for example, the component selector 104 may display, for each component, one or more of a title 104a, a part number 104b, a visual representation 104c (e.g., a photograph or sketch), or product specifications 104d (e.g., dimensions, style, etc.). When presenting stock components, component selector 104 may present stock information 104e. Stock information 104e can present information about existing stock of the item, such as the total number of the component that are available in stock, that are used in the current structural design, that remain available for use, that are damaged, etc. Component selector 104 may present other information, such as price, estimated shipping price, estimated shipping time, etc.

Components can become available in the inventory browser 102 and the component selector 104 through integration into the design software application, or through importation. For example, the design software application may include an "import" function that enables users to import stock files, libraries, etc. For example, the user interface 100 may include an import menu selection, such as File>Open, File>Import, etc., though any appropriate import selection falls within the scope of the present invention. When a user loads a stock file using the import function, the design software application creates a library of available styles in the inventory browser 102/component selector 104 based on styles contained in the stock file. In one or more implementations, the design software application creates the library regardless of whether or not an existing structural design is loaded in the design software application.

In one or more implementations, one or both of the component selector 104 or the inventory browser 102 distinguish between components and assemblies. In general, components represent the smallest discrete unit represented in user interface 100, and assemblies represent combinations of components. For example, a door assembly may include as components a door, a door frame, and door hardware (e.g., a knob, a handle, hinges, etc.). As such, designers may use the component selector 104 and/or the inventory browser 102 to browse and select items at both the assembly level and the sub-assembly (i.e., component) level. In one or more implementations, assemblies may include other assemblies, such as a room assembly that includes wall assemblies and a door assembly. Providing both assemblies and components affords designers the simplicity and convenience of working with assemblies, as well as the flexibility and customization available through use of components. In one or more implementations, the design software application enables designers to create and use their own assemblies.

The design area 106 visually presents structural designs, and enables designers to add or remove components or assemblies with respect to structural designs. As part of the presented structural designs, the design area 106 can visually present various components or assemblies, as well identifiers (e.g., part name, part number, etc). In the depicted example, the design area 106 presents a portion of an office, including component identifiers. For example, the depicted design area 106 identifies two wall assemblies (with part identifiers F292 and F293), a sliding glass door (part number F230) and a door frame (part number BD6).

In one or more implementations, the design area 106 visually distinguishes between new components (or assemblies) and stock components (or assemblies). For example, the design area 106 may present stock components in one color (or one set of colors), and present new components in a different color (or different set of colors). Additionally or alternatively, the design area 106 may apply a first shading (or first set of shadings) to stock components, and apply a different shading (or different set of shadings) to new components. In one or more implementations, the design area 106 may present component identifiers in different colors to indicate which components are from stock, and which components are new. Of course, any other mechanism for visually distinguishing between stock components and new components falls within the scope of the present invention.

One will appreciate in light of the disclosure herein that the visual distinction of stock component from new components can provide the designer with important feedback. For example, a designer may note that a portion of the design (i.e., an assembly such as a room or wall) includes only new parts. The designer can then review available stock components using the inventory browser 102 to find stock components to replace the new components. Furthermore, the designer can readily note exactly where in the design stock components are being used.

One or more implementations of the design software application are configured both to edit existing structural designs and to create new structural designs. In either case, the design software application makes it easy to incorporate existing stock into structural designs. As indicated previously, one or more implementations of the user interface 100 provide import/open functionality that enables importation of stock files. Stock files may comprise existing designs (e.g., the design in which the stock components are presently arranged), inventories generated from existing designs, spreadsheets, and the like. When the design software application receives a stock file, the design software application identifies components included in the stock file and adds them to the stock inventory. The design software application then makes these stock components available to designers for use in structural designs.

In one or more implementations, the user interface 100 is configured to enable a designer to provide existing structural designs to the design software application. For example, the user interface 100 may provide import/open functionality that enables importation of existing structural designs. When the design software application receives an existing structural design the design software application can be configured to compare components of the existing design with available stock. The design software application can also be configured to automatically substitute matches between components and/or assemblies of the existing design with components and/or assemblies from the available stock. For example, when the design software application receives an existing design and a stock file, the design software application can automatically substitute stock component with components in the existing design. When doing so, the design software application can substitute components at the assembly level and/or at the sub-assembly level. The user interface 100 can present the updated design in the design area 106 while visually distinguishing between stock components and new components, and designer can use user interface 100 to modify the imported design, if desired.

In one or more implementations, the user interface 100 is configured to enable a designer to create a structural design from scratch, or to manually modify a structural design. For example, a designer may select a component from the component selector 104, and place the component within the design area 106 (e.g., via drag-and-drop or any other appropriate operation). Depending on the type of component the designer is placing, the design software application can take one or more actions. If the component the designer is placing is from stock, the design software application may place the component in the design, visually indicate that the component is from stock, and automatically update the stock inventory to reflect that the component is part of the design. For example, if the component the designer is placing is the sliding glass door depicted in connection with component selector 104, the design area 106 may visually distinguish the component itself and/or its designator (F230) as being from stock. In addition, the component selector 104 may automatically update the stock information 104e to reflect use of the component.

Alternatively, if the component being placed in the new design is a new (i.e., non-stock) component, the design software application can compare the new component to the stock inventory. If the design software application finds a match between the new component and a component in the stock inventory, the design software application can associate the matching stock component with the new design. In other words, the design software application can place the matching stock component in the design in place of the new component. The design software application may also visually indicate that the component is from stock, and automatically update the stock inventory to reflect that the component is part of the design as part of associating the matching stock component with the new design. For example, if the component the designer is placing is a new sliding glass door that matches the stock sliding glass door depicted in connection with component selector 104, the design software application may place the stock door in the design instead of the new door. The design software application may also update the design area 106 to visually distinguish the component and/or its designator (F230) as being from stock, and update the component selector 104 to display updated stock information 104e that reflects use of the stock component.

In one or more implementations, the design software application automatically substitutes new components or assemblies with their stock counterparts without user interaction. In additional or alternative implementations, the design software application automatically matches the components or assemblies, but prompts the designer prior to making a substitution.

When matching components, the design software application may match based on one of several parameters, such as part type and visual style. In general, different components may have the same type or functionality (e.g., size, compatibility with adjacent structure or parts), but may have different visual styles. For example, different doors of the same functional type may comprise finishes of different colors, or may comprise construction from different materials. As such, the design software application can match components based on type, or based on both type and style. Generally, when the design software application makes automatic substitutions, the design software application substitutes stock items that have an "exact" match (i.e., a match in both type and style) with the desired new item. If the design software application finds a stock component that has a "close" or "similar" match (i.e., a match in type, but not style/aesthetics), the design software application may prompt the user to place the stock component in the design, even though it is of a different style.

In one or more implementations, the design software application is configured to modify surrounding components in the design. For example, a designer may place a component or assembly that does not match the style of surrounding components. In such situations, the design software application may automatically modify the surrounding components to that they match the visual style of the placed component or assembly. In addition, a designer may place a component that does not functionally match with surrounding components. In such situations, the design software application may automatically modify surrounding components so that they match the functionality of the placed component or assembly. For example, if a designer places a sliding door in a space reserved for a swinging door, the design software application may automatically modify the door frame and surrounding walls to accommodate the swinging door. In some situations, the design software application may modify surrounding components so that they match the size of the placed component or assembly.

In either situation, the design software application may consider both stock components and new components when modifying surrounding components. For example, a designer may place a stock sliding door in a design, and the design software application may be able to modify a new surrounding door frame and new walls to accommodate the stock sliding door. When doing so, the design software application may replace the new door frame and the new wall components with a stock door frame and/or stock wall components. The design software application may replace surrounding components with, or without, additional user input depending on implementation and/or user preference.

In one or more implementations, the design software application may "deconstruct" assemblies to optimize use of stock components. For example, a designer may place a new door assembly that includes a door frame, a door, hinges, and a door knob. The design software application may determine that the stock inventory contains a door that could be part of the assembly. The design software application may then replace the new door component in the assembly with the stock door component, but maintain the other components as new components.

Additionally, the user interface 100 optionally presents a percentage of stock components used as part of a structural design. As depicted, for example, design area 106 may include a percentage 106a of stock components used in the displayed structural design. The percentage 106a of stock components used in the design can update in real time. Thus, a designer can have real time knowledge of the amount of stock components being used in the design. This can allow the designer to maximize or otherwise control the percentage of stock components as the design progresses.

Figure 2:
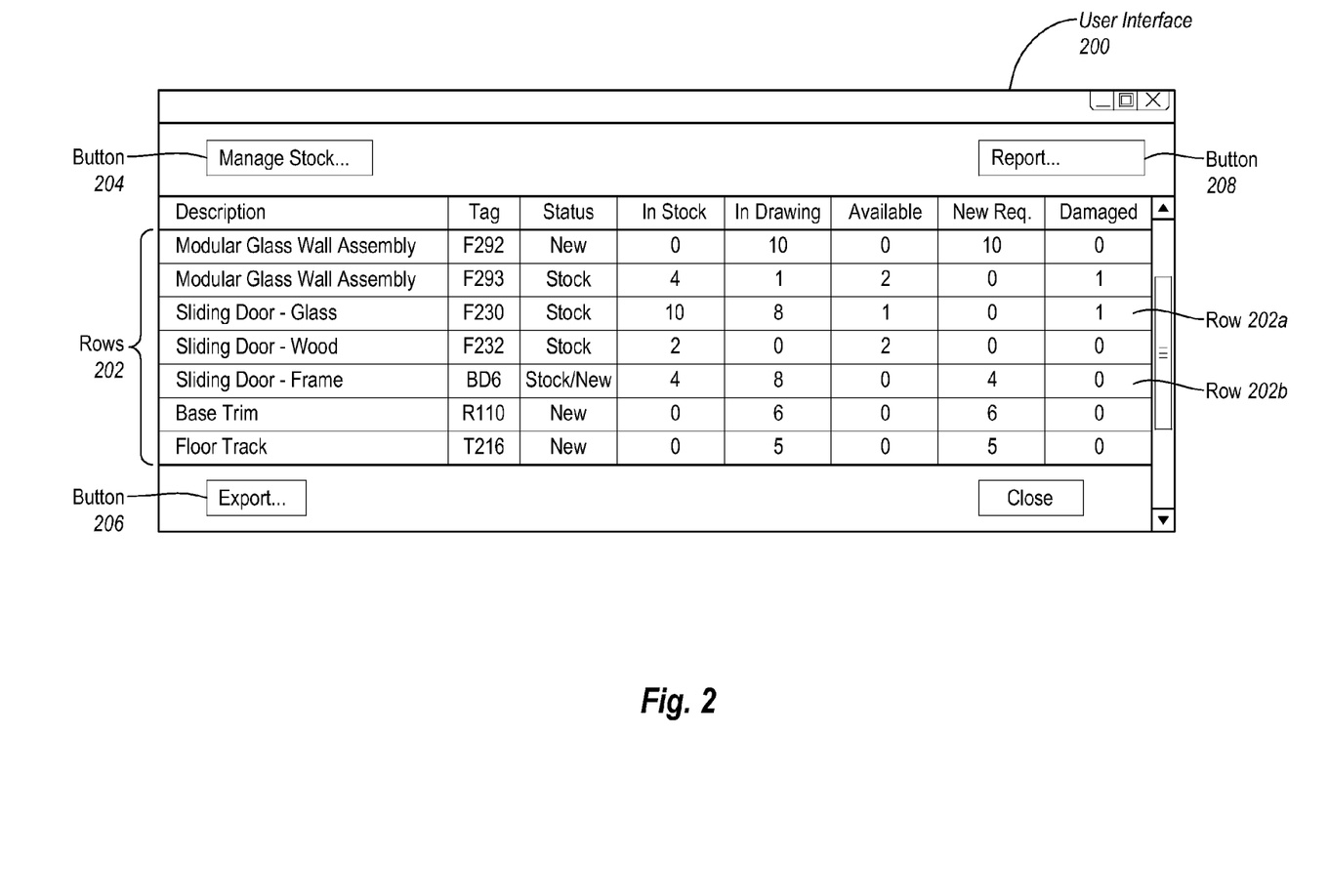
FIG. 2 illustrates a schematic diagram of a user interface of an exemplary design software application with which an implementation of the present invention can integrate to present an analysis of use of stock components in a structural design.

In one or more implementations, the design software application provides one or more user interfaces that enable designers to audit stock components used in structural designs and new components required or the structural designs. For example, FIG. 2 illustrates an exemplary user interface 200 of a design software application for presenting an analysis of use of stock components in a structural design. The user interface 200 is configured so that a designer can see—at a glance—components that are used in a design, including which components are being re-used and which components need to be purchased.

As depicted, the user interface 200 enumerates components (and/or assemblies) used as part of a structural design. For example, the user interface 200 includes one or more rows 202 that specify components used in the structural design. As depicted, the rows 202 may specify one or both of stock components or new components, and can include a variety of data. For example, the depicted rows 202 include a component description, a tag (e.g., a part identifier), and a status (e.g., new, stock). The depicted rows 202 can also indicate how many of the components are in stock, how many of the components are in a drawing (structural design), how many of the components are available, and how many of the components will need to be purchased. Other data points are also possible, such as estimated component cost, estimated shipping cost, estimated shipping time, etc.

In addition, the depicted rows may indicate whether any of the components that are in stock are damaged or otherwise unavailable for use in a structural design. In one or more implementations, the user interface 200 enables a designer to specify the number of damaged components (if any). In additional or alternate implementations, stock files contain information about damaged components, and/or other user interfaces enable a designer to identify damaged components.

For example, row 202a identifies a component described as "Sliding Door—Glass," which may correspond to the stock component depicted in component selector 104 of FIG. 1. Row 202a identifies this component as being in stock, with a total of ten available. Row 202a also indicates that eight of the components are in the drawing, and that one of the components is damaged. As such, row 202a indicates that one component is available. In some situations, for a given component a design may use both stock and new units. Row 202b, for example, specifies that there are four components identified as "Sliding Door—Frame" in stock, and that there are eight of the frames used in the drawing. As such, row 202b specifies that four new frames are required.

In one or more implementations, the user interface 200 uses different colors to help distinguish between various components. For example, rows corresponding to stock components may appear in one color (or one set of colors) and rows corresponding to new components may appear in a different color (or a different set of colors). Rows that correspond to both stock components and new components may blend colors, or appear in a yet different color (or a yet different set of colors). In addition, the user interface 200 may visually distinguish stock components that include damaged components in some manner, such as by highlighting the cell specifying the number of damaged units in a particular color.

FIG. 2 also depicts that the user interface 200 may include additional component-related functionality. For example, a button 204 (manage stock) may provide functionality to import stock files. In addition, a button 206 (export) may provide functionality to export component lists, such as to a spreadsheet or purchase order format. Furthermore, a button 208 (report) may provide additional information about stock, about components used in a drawing, or any other appropriate reports. For example, reports may include reports related to cost analysis, re-use analysis, etc.

One will appreciate that the user interface 200 can further inform a designer what stock components have been used in the new design and what stock components remain. In addition to the foregoing, the user interface 200 can inform a designer of which parts need to be purchased. In one or more implementations, clicking on the description of a particular part will then show the exact location of the component in the design in a 2D viewer and/or 3D viewer. This can enable an installer to quickly determine how and where each of the stock components is used in the new design.

In one or more implementations, the design software application can present designers with the price ramifications of a design. For example, one or more of user interface 100 or user interface 200 can present a designer with a price quotation of components that are currently placed in a design. Stock components can be represented as having a zero price, since they are already owned. As such, the price quotation will generally be lower as a designer uses stock components in place of new components. The design software application can further present designers with a comparison on how much savings were obtained through the resuse of stock components.

Figure 3:
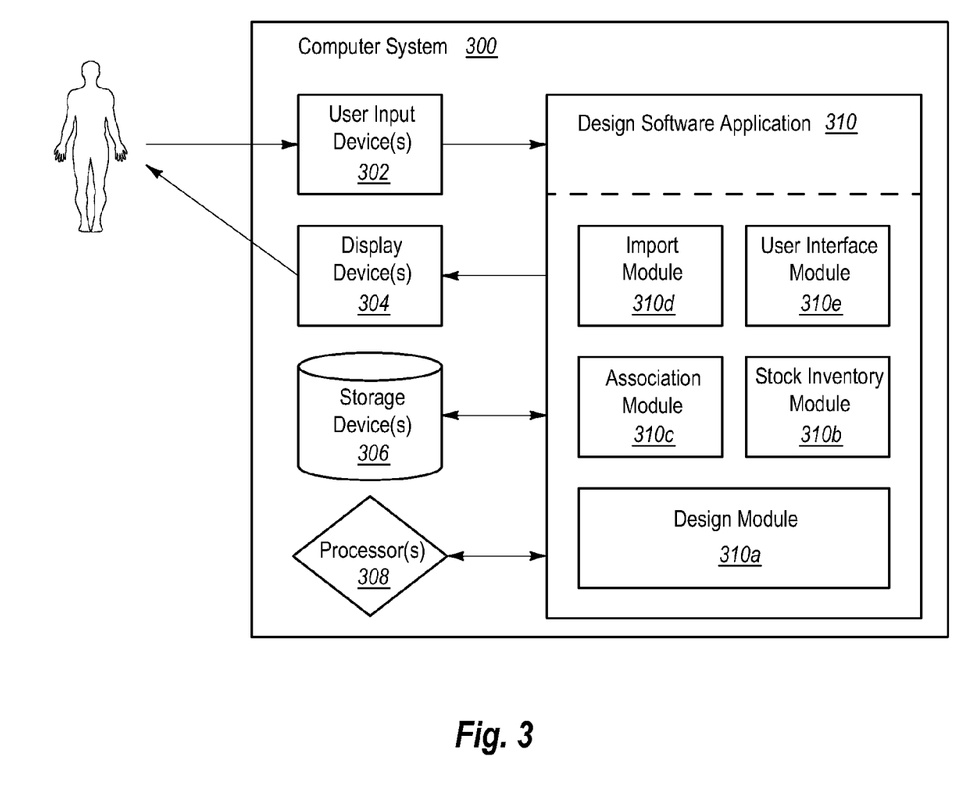
FIG. 3 illustrates an exemplary computer architecture for integrating stock components in a structural design in accordance with an implementation of the present invention.

FIG. 3 illustrates exemplary computer architecture 300 for reusing stock components in a structural design. As depicted, the computer architecture 300 includes computer hardware, such as one or more user input devices 302 (e.g., keyboard, mouse, etc.), one or more display devices 304 (e.g., computer monitor(s)), one or more storage devices 306 (e.g., system memory, computer-readable media), and one or more processors 308. In addition, the computer architecture 300 includes a design software application 310. The computer architecture 300 may execute the design software application 310 using the storage device(s) 306 and the processor(s) 308. In doing so, the computer architecture 300 may provide input to the design software application 310 using user input device(s) 302 and storage device(s) 306, and may display user interfaces of the design software application 310 using the display device(s) 304.

As depicted, the design software application 310 can include a plurality of modules, such as a design module 310a, a stock inventory module 310b, an association module 310c, an import module 310d, and a user interface module 310e. One will appreciate that functionality of the depicted modules can be implemented in a variety of manners, using software modules (e.g., functions, routines, classes, objects, code files, etc.) that map directly to the depicted modules, or using software modules that do not map directly to the depicted modules. For example, a single software module may implement the functionality of multiple of the depicted modules (or even all of them). In another example, multiple software modules may be used to implement the functionality of a single one of the depicted modules.

One or more implementations of the design module 310a load, display, and provide editing functionality for structural designs. For example, the design module 310a may provide programmatic logic behind the user interfaces 100, 200 of FIGS. 1 and 2. One or more implementations of the design module 310a also distinguish between new components and stock components, and incorporate stock components into structural designs (either automatically or with user interaction).

One or more implementations of the stock inventory module 310b maintain an inventory of stock components. For example, the stock inventory module 310b may receive one or more stock files (e.g., from the import module 310d) and identify stock components that are included in the stock file(s). The stock inventory module 310b may also maintain one or more databases of stock components and assemblies. The stock inventory module 310b may use the storage device(s) 306 for storage of the database(s). As part of managing the database(s), the stock inventory module 310b may identify components that are damaged or otherwise unavailable for use in structural designs. For example, the stock inventory module 310b may receive user input (e.g., via user input device(s) 302) specifying damaged components, or may identify damaged components based on data in the stock file(s).

One or more implementations of the association module 310e work in connection with the design module 310d to associate stock components with components of a structural design. For example, the association module 310c may automatically match components of a structural design imported using import module 310a to stock components. In another example, the association module 310c may associate newly placed components with stock components.

One or more implementations of the import module 310d operate to import data into the design software application 310. For example, the import module 310d may import structural designs and stock files. In some situations, the import module 310d may import data from the storage device(s) 306. The import module 310d may also import data from remote computer systems, such as over a network. One or more implementations of the user interface module 310e generate any user interfaces of the design software application 310. For example, the user interface module 310e may generate the example user interfaces 100, 200 depicted in FIGS. 1 and 2.

In addition to the foregoing, the design software system can identify each component's location, type, size, relationships to other components, etc. Upon identification of the components, the design software system can create intelligent, automatically resolvable objects for each component that includes one or more attributes and product parameters.

The design software system can create and compile objects in virtually any object-oriented programming language, including, for example, an object-oriented programming language such as the JAVA programming language. No matter how created, the design software system can store the objects within a single data structure, and resolve each object (where applicable) in the design to conform to the given design intent. The design software system can thus appropriately propagate user input at any level of this dataset to all objects in the data structure consistent with the design intent, thereby resolving the complete design through the resolving of each object individually. These programming objects can include new components and stock components whether they are individual parts or assemblies.

Each object in the database can include one or more attributes and product parameters, or reference to one or more databases comprising information of the same. Attributes can include product features and characteristics, such as, for example, size, shape, color, type, texture, price, material composition, etc. Product parameters can include rules and behaviors associated with each component. For example, the rules and behaviors can include the type and number of connectors and bracketry need to support each component or assembly, how the components and assemblies interact with other design elements, applicable codes, manufacturing guidelines, and physical limitations.

Figure 4:
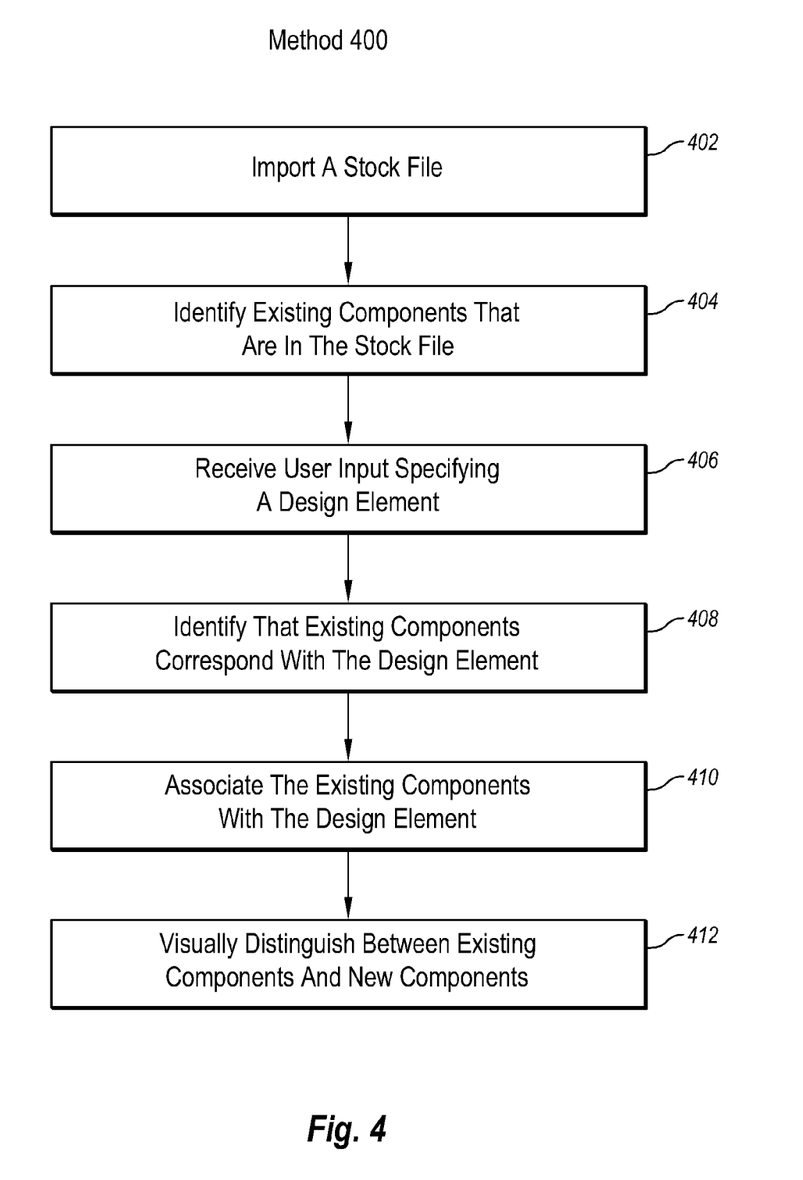
FIG. 4 illustrates a flowchart of a series of acts in a method in accordance with an implementation of the present invention of visually modeling a new structural design, in real-time, at a structural design software application.
Figure 5:
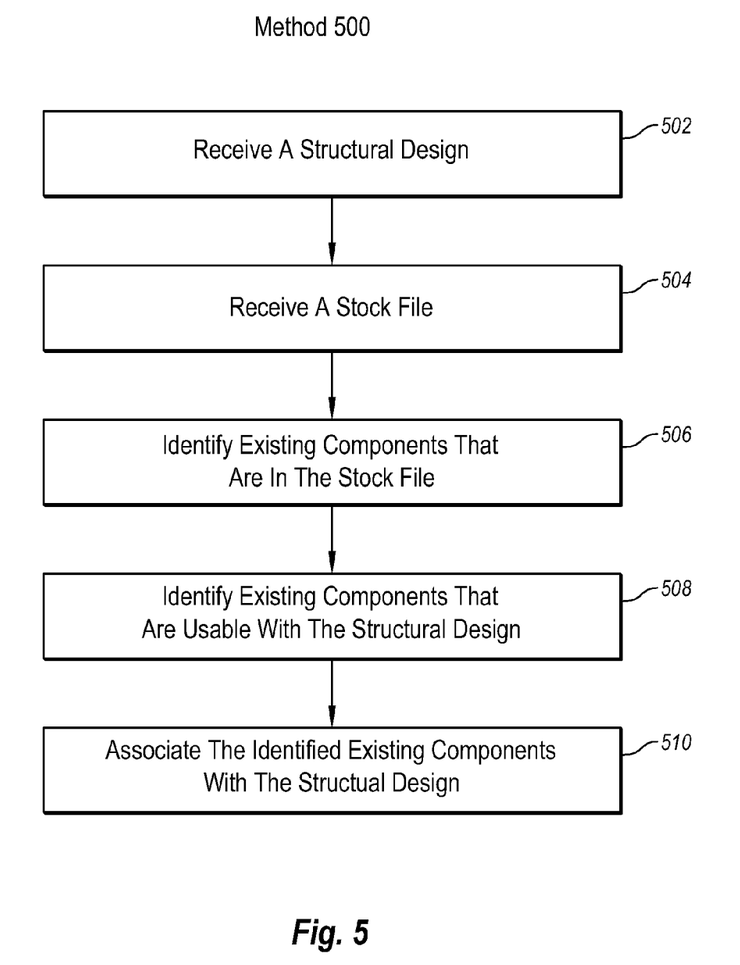
FIG. 5 illustrates a flowchart of a series of acts in a method in accordance with an implementation of the present invention of modifying a structural design, in real-time, at a structural design software application.

FIGS. 1-3 provide a number of user interfaces, schematics, and mechanisms for incorporating stock components into structural designs. In addition to the foregoing, implementations of the present invention can also be described in terms of flowcharts comprising one or more acts in a method for accomplishing a particular result. For example, FIG. 4 illustrates a method 400 of visually modeling a new structural design, in real-time, at a structural design software application. Similarly, FIG. 5 illustrates a method 500 of modifying a structural design, in real-time, at a structural design software application. The acts of FIGS. 4 and 5 are discussed more fully below with respect to the user interfaces and schematics of FIGS. 1-3. Of course, as a preliminary manner, one of ordinary skill in the art will recognize that the methods explained in detail herein can be modified. For example various acts of each method described can be omitted or expanded, and the order of the various acts of each method described can be altered as desired.

For example, FIG. 4 shows that the method 400 of visually modeling a new structural design, in real-time, at a structural design software application can comprise an act 402 of importing a stock file. Act 402 can include importing a stock file, the stock file including a plurality of existing components that are used in an existing structural design, the plurality of existing components being available for use in the new structural design. For example, the import module 310d can import a stock file. The stock file may comprise an existing structural design, a data file generated from an existing structural design, a spreadsheet, etc. A designer may trigger use of the import module 310d using a user interface control, such as the button 204 (manage stock) of the user interface 200.

In addition, FIG. 4 shows that the method 400 in accordance with an implementation of the present invention can comprise an act 404 of identifying existing components that are in the stock file. Act 404 can include identifying each of the plurality of existing components that are in the stock file. For example, the stock inventory module 310b can analyze the stock file imported during act 402 and identify stock components (and possibly assemblies) that are included in the stock file.

FIG. 4 also shows that the method 400 in accordance with an implementation of the present invention can comprise an act 406 of receiving user input specifying a design element. Act 406 can include receiving user input that specifies a new design element of the new structural design. For example, user interface module 310e can receive user input specifying a new component via the user interface 100 of FIG. 1. For example, a designer may use the inventory browser 102 to select a sub-category (e.g., doors) of the "products" category, and then use the component selector 104 to select the new component (e.g., a new door). The designer may place the new component into a structural design within the design area 106. The design module 310a can receive notice of the placement of the new component.

Furthermore, FIG. 4 shows that the method 400 in accordance with an implementation of the present invention can comprise an act 408 of identifying that existing components correspond with the design element. Act 408 can include automatically identifying that one or more of the plurality of existing components correspond with one or more components of the new design element. For example, the design module 310a may trigger the association module 310c. The association module 310c can, in turn, consult a stock inventory database directly or work with the stock inventory module 310b to determine if the new component matches any stock components from the stock file imported during act 402.

Still further, FIG. 4 shows that the method 400 in accordance with an implementation of the present invention can comprise an act 410 of associating the existing components with the design element. Act 410 can include associating the automatically identified one or more of the plurality of existing components with the new structural design. For example, the design module 310a can incorporate the stock component into the structural design instead of the requested new component. In addition, the stock inventory module 310b can update the stock inventory database to reflect use of the stock component in the structural design. Updating the stock inventory database may update one or more user interfaces. For example, when displaying the stock component in the component selector 104 of user interface 100, the user interface module 310e may indicate that at least one of the stock components is in use. In addition, the user interface 200 of FIG. 2 may also reflect use of the stock component in the structural design.

Additionally, FIG. 4 shows that the method 400 in accordance with an implementation of the present invention can comprise an act 412 of visually distinguishing between existing components and new components. Act 412 can include visually distinguishing between any existing components that are associated with the new structural design and any new components that are associated with the new structural design. For example, when displaying design area 106, user interface module 310e can use different colors or different shading to indicate which components of the displayed design are from stock, and which components are new. In addition, the user interface 200 of FIG. 2 may highlight rows corresponding to stock components using one color (or one set of colors), and rows corresponding to new components in a different color (or different set of colors).

In addition to the method 400 of FIG. 4, FIG. 5 shows that the method 500 of modifying a structural design in, real-time, at a structural design software application can comprise an act 502 of receiving a structural design. Act 502 can include receiving a first structural design. For example, the import module 310d can import a structural design file.

FIG. 5 also shows that the method 500 in accordance with an implementation of the present invention can comprise an act 504 of receiving a stock file. Act 504 can include receiving a stock file, the stock file including a plurality of existing components that are used in an existing second structural design, the plurality of existing components being available for use in the first structural design. For example, the import module 310d can import a stock file. The stock file may comprise the existing structural design itself, a data file generated from the existing structural design, a spreadsheet, etc. A designer may trigger use of the import module 310d with a user interface control, such as the button 204 (manage stock) of user interface 200.

FIG. 5 also shows that the method 500 in accordance with an implementation of the present invention can comprise an act 506 of identifying existing components that are in the stock file. Act 506 can include identifying each of the plurality of existing components that are in the stock file. For example, the stock inventory module 310b can analyze the stock file imported during act 504 and identify stock components (and possibly assemblies) that are included in the stock file.

FIG. 5 also shows that the method 500 in accordance with an implementation of the present invention can comprise an act 508 of identifying existing components that are usable with the structural design. Act 508 can include identifying one or more of the plurality of existing components that are usable with the first structural design. For example, the association module 310c can compare the structural design imported in act 502 with stock components included in the stock file imported in act 504. When doing so, the association module 310c can identify matches between components in the imported structural design and the stock components. Matches may comprise exact matches that match in both type and style, or similar matches that match in type but not style.

FIG. 5 also shows that the method 500 in accordance with an implementation of the present invention can comprise an act 510 of associating the identified existing components with the structural design. Act 510 can include associating the identified one or more of the plurality of existing components with the first structural design. For example, the design module 310a can associate any matching stock components identified in act 508 with the imported structural design. As such, with very little effort, a designer can incorporate existing stock into an already-created design.

Accordingly, FIGS. 1-5 provide a number of components, user interfaces, schematics, and mechanisms for easy and efficient structural design and/or reconfiguration while reusing existing stock components. One or more implementations allow a designer to import a stock file containing an inventory of stock components that are usable as part of a structural design. The implementations described herein incorporate the stock components in a structural design while tracking, in real-time, the availability of stock components. One or more implementations automatically correlate stock components with components already inserted into a structural design. One or more implementations automatically correlate stock components with new components as a designer inserts them into the structural design. One or more implementations visually distinguish between new components in the structural design and stock components in the structural design.

Implementations of the present invention may comprise or utilize a special purpose or general-purpose computer including computer hardware, such as, for example, one or more processors and system memory, as discussed in greater detail below. Implementations within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A computerized method for use in a computer system that includes one or more processors and a system memory, the method for automatically reusing existing physical components by visually modeling in a user interface a new structural design, in real-time, using a mixture of stock components that are in physical inventory or are installed in a pre-existing physical structure, and one or more new components that can be selected for installation into a new physical structure, comprising the acts of:
    importing an electronic stock file into the computer system, the electronic stock file including a plurality of existing components that represent a corresponding plurality of stock components that are currently used in an existing structure, or are otherwise available in physical inventory;
    receiving user input that specifies a new design element of a new structural design in a design area of a user interface of a design application, wherein the new design element relates to a physical product that is new, and not available through physical inventory or an existing structure;
    automatically identifying that one or more of the plurality of existing components matches the new design element;
    automatically replacing the new design element with the matched, existing component in the design area in real time, such that a stock component is visibly specified in the new structural design in the design area; and
    visually distinguishing the matched existing component from another new design element in the design area of the user interface in real-time so that the new structural design shows that it will be physically installed with at least one previously installed physical stock component and at least one new physical component;
    wherein the design area provides real-time visual feedback that enables the user to reuse existing physical components and avoid unnecessary ordering of new components to complete a design.

2. The method as recited in claim 1, further comprising:
    providing a second user interface through the design application that identifies a first physical component that is already installed in a physical space, and a second physical component that is in inventory but not installed in a physical space;
    receiving user input through the design application that identifies the first physical component as being damaged;
    marking the first physical component identified as being damaged so that the first physical component cannot be used by the computer system to automatically replace any design elements in the design area.

3. The method as recited in claim 1, further comprising acts of:
    visually presenting an inventory of the plurality of existing components that are in the stock file; and
    updating the inventory as existing components from the plurality of existing components are associated with the new structural design.

4. The method as recited in claim 3, further comprising:
    displaying in the design area the updated inventory to show that the number of stock components has been reduced for each matched, existing component that is included in the design area;
    wherein the design area indicates, in real-time, how many stock components remain.

5. The method as recited in claim 1, wherein the act of visually distinguishing comprises an act of using different colors to distinguish between existing components and new components.

6. The method as recited in claim 1, further comprising automatically replacing a plurality of first components with a plurality of identified existing components into the new structural design.

7. The method as recited in claim 1, further comprising automatically identifying an exact match between one or more existing components and the one or more components of the new design element, an exact match comprising an exact match between component type and visual style.

8. The method as recited in claim 1, further comprising automatically identifying a similar but inexact match between one or more existing components and the one or more components of the new design element, a similar match comprising a match between components having similar function but different styles in the related physical products.

9. The method as recited in claim 1, further comprising automatically adjusting one or more of a size or location of the one or more new components in the design area to accommodate the matched, existing component.

10. The method as recited in claim 1, further comprising acts of:
   visually presenting a percentage of existing components used in the new structural design; and
   graphically updating the percentage shown in the design area in real-time as the new structural design is modified.

11. The method as recited in claim 1, wherein the design element of the new structural design comprises an assembly in a section of the design area, the assembly including a plurality of components, the method further comprising automatically replacing one or more components of the assembly with one or more identified existing components, such that the assembly comprises both existing components and first components corresponding to stock components and new components.

12. A computerized method for use in a computer system including one or more processors and system memory, the computerized method for automatically modifying a structural design in a design area of a user interface in real-time based at least on matches in physical component type, the method comprising the acts of:
   receiving a first structural design comprising a plurality of first components arranged in a design area displayed in a user interface, each component having a component type and relating to a first, physical component to be installed in a physical location;
   receiving a stock file, the stock file including a plurality of existing components corresponding to a plurality of stock components, the stock components comprising physical products that are installed in an existing second structural design or that exist in physical inventory;
   identifying one or more of the plurality of existing components that are usable in the first structural design based at least on a component type;
   associating the identified one or more of the plurality of existing components with the first structural design, such that an existing component is matched to one or more first components;
   automatically replacing one of the first components in the design area with a matched existing component, such that a first product is automatically replaced in the design area in real time with a stock component that matches at least the component type of the first component; and
   displaying through a user interface the design area showing at least one first component and the matched, existing component therein, such that the replaced component is visually distinguished from the at least one first component in the design area as being a stock component that is already installed in the second existing structural design;
   wherein the design area provides real-time visual feedback that enables the user to reuse existing physical components and avoids unnecessary ordering of new components to complete a design.

13. The method as recited in claim 12, wherein the act of identifying one or more of the plurality of existing components that are usable further comprises identifying an exact match between the first component and the existing component, the exact match comprising an exact match between the component type and a visual style of the first component and the second component.

14. The method as recited in claim 12, wherein the act of identifying one or more of the plurality of existing components that are usable further comprises identifying a close, inexact match between the first component and the existing component, a close match comprising a match between components having similar but not identical function.

15. The method as recited in claim 14, further comprising providing one or more prompts through the user interface that enable the user to accept or reject the inexactly matched existing component.

16. The method as recited in claim 12, wherein the first component and the existing component relate to physical components having different aesthetic styles.

17. The method as recited in claim 12, wherein the acts of identifying one or more of the plurality of existing components and associating the identified one or more of the plurality of existing components with the first structural design are performed automatically by the computer system.

18. The method as recited in claim 12, further comprising acts of:
   visually presenting an inventory of the plurality of existing components that are in the stock file; and
   updating the inventory to remove existing components from the plurality of existing components when the existing components are placed in the first structural design.

19. The method as recited in claim 12, wherein visually distinguishing between the at least one first component and the matched, existing component comprises providing using a first color for existing components and a second color for new components.

20. The method as recited in claim 12, further comprising an act of automatically modifying one or more of a size or location of at least one component in the first structural design to accommodate an existing component.

21. The method as recited in claim 12, further comprising:
   receiving a user selection to change the user interface to a 3D view;
   displaying the design area, such that both the at least one first component and the matched, existing component are shown in 3D in the user interface.

22. The method as recited in claim 21, further comprising automatically adjusting a dimension or location of a first component in the design area to accommodate the user-selected existing component.

23. The method as recited in claim 22, further comprising:
   receiving a user selection to change the user interface to a 2D view;
   displaying the design area in the 2D view, such that both the at least one first component and the matched, existing component are shown in 2D, and each component that was adjusted in dimension or location in the 3D view is shown adjusted in the 2D view.

24. A computer program product for use on a computer system, comprising one or more non-transitory computer storage media, excluding carrier waves or signals, having stored thereon computer-executable instructions that, when executed a processor, cause the computer system to perform a method for visually creating a new structural design, in real time, using a mixture of stock components and one of more new components, comprising:
   importing an electronic stock file into the computer system, the stock file including a plurality of existing components that represent a corresponding plurality of stock components that are currently installed in an existing structure, or are otherwise available in inventory;
   receiving user input that specifies a new design element of a new structural design, wherein a new design element relates to a physical component that is new, and not available through inventory or an existing structure;

automatically identifying that one or more of the plurality of existing components matches the new design element;

automatically replacing the new design element with the matched, existing component, such that a stock component is visibly specified in the new structural design in the design area; and visually distinguishing the matched existing component from another new design in the design area of the user interface in real-time so that the new structural design shows that it will be physically installed with at least one previously installed stock component and at least one new physical component;

wherein the design area provides real-time visual feedback that enables the user to reuse existing physical components and avoid unnecessary ordering of new components to complete a design.

* * * * *